(12) United States Patent
Gutierrez et al.

(10) Patent No.: US 7,359,131 B1
(45) Date of Patent: Apr. 15, 2008

(54) LENS POSITIONING SYSTEMS AND METHODS

(75) Inventors: Roman C. Gutierrez, Arcadia, CA (US); Robert J. Calvet, Pasadena, CA (US)

(73) Assignee: Siimpel Corporation, Arcadia, CA (US)

( * ) Notice: Subject to any disclaimer, the term of this patent is extended or adjusted under 35 U.S.C. 154(b) by 0 days.

(21) Appl. No.: 11/511,001

(22) Filed: Aug. 28, 2006

Related U.S. Application Data

(63) Continuation of application No. 11/487,908, filed on Jul. 17, 2006, now abandoned, which is a continuation-in-part of application No. 11/361,608, filed on Feb. 24, 2006.

(60) Provisional application No. 60/657,261, filed on Feb. 28, 2005.

(51) Int. Cl.
*G02B 7/02* (2006.01)
*G02B 23/00* (2006.01)
*G02B 21/00* (2006.01)
*G02B 7/04* (2006.01)
*G03B 17/00* (2006.01)

(52) U.S. Cl. .................. 359/819; 359/813; 359/823; 359/826; 359/423; 359/425; 359/511; 359/611; 396/72; 396/144

(58) Field of Classification Search ................ 359/811, 359/813, 819, 820, 823, 826, 830, 423, 425, 359/690, 687, 688, 511, 611; 396/72, 73, 396/144, 214, 349, 379, 461, 502, 509; 348/335, 348/375; 353/43, 100, 101
See application file for complete search history.

(56) References Cited

U.S. PATENT DOCUMENTS

| | | | | |
|---|---|---|---|---|
| 2,173,942 A | * | 9/1939 | Hiatt et al. | 40/660 |
| 2,478,336 A | * | 8/1949 | Stein et al. | 353/43 |
| 3,153,690 A | * | 10/1964 | Kuyt et al. | 359/423 |
| 3,715,149 A | * | 2/1973 | Freeland | 359/611 |
| 4,307,951 A | * | 12/1981 | Saito et al. | 396/72 |
| 5,202,706 A | * | 4/1993 | Hasegawa | 359/819 |
| 6,349,003 B1 | * | 2/2002 | Ko | 359/694 |

* cited by examiner

*Primary Examiner*—Loha Ben
(74) *Attorney, Agent, or Firm*—MacPherson Kwok Chen & Heid LLP; Brent A. Folsom

(57) ABSTRACT

An improved lens mount and related lens and lens barrel positioning methods are provided. In one example, a lens mount for use with a miniature camera can include a ring member having a substantially cylindrical interior surface defining a substantially cylindrical interior space. A plurality of elongate ribs are disposed on the interior surface of the ring member and are adapted to exert pressure against an external surface of a lens barrel received by the ring member. In another example, a method of positioning a lens barrel includes inserting a lens barrel into a ring member having a substantially cylindrical interior surface. Pressure can be exerted against an external surface of the lens barrel from a plurality of elongate ribs disposed on the interior surface of the ring member. The pressure can prevent rotation of the lens barrel along at least three axes of rotational freedom.

16 Claims, 6 Drawing Sheets

LENS POSITIONING SYSTEMS AND METHODS

CROSS-REFERENCE TO RELATED APPLICATIONS

This application is a continuation application of U.S. patent application Ser. No. 11/487,908 filed on Jul. 17, 2006 entitled "Lens Positioning Systems and Methods", now abandoned, which is a continuation-in-part application of U.S. patent application Ser. No. 11/361,608 filed on Feb. 24, 2006 entitled "Autofocus Camera", which claims the benefit of U.S. Provisional Patent Application No. 60/657,261 filed on Feb. 28, 2005 entitled "Autofocus Camera", all of which are incorporated herein by reference.

BACKGROUND

1. Field of the Invention

The present invention generally relates to optics and, more particularly, to the alignment of lenses that are suitable for use with miniature cameras.

2. Related Art

Digital cameras typically use one or more lenses to provide focused or zoomed images to an imager. In order for the imager to obtain accurate images, it is important that the lenses be properly aligned with the imager. In particular, if lenses are skewed in one or more degrees of rotational freedom or translational freedom, light may not be properly focused on the imager. This can result in images appearing off centered or distorted on the imager.

Manufacturers frequently rely on camera components to be manufactured within sufficiently small tolerances (for example, within approximately 0.025 mm) such that when the components are assembled, lenses are sufficiently aligned to provide satisfactory image quality on an imager. Unfortunately, optical components may not always be available within particular desired tolerances. The accumulation of variations in optical component characteristics, dimensions, and tolerances can result in misalignment of lenses.

In addition, even when lenses are initially properly aligned with an imager, they may become misaligned as a result of impacts received by the digital camera. As a result, relying on manufacturing tolerances and accurate assembly alone can still lead to misalignment of lenses over time. Also, miniature cameras are generally unable to provide meaningful image stabilization. For example, if lenses experience lateral movement in relation to the imager, conventional miniature cameras typically cannot re-align the lenses in relation to the imager to compensate for such anomalies.

Accordingly, there is a need for an improved approach to lens alignment that overcomes the deficiencies in prior approaches as discussed above. In particular, there is a need to provide an improved lens alignment approach that provides for reliable alignment of one or more lenses when employed in personal electronic devices such as miniature digital cameras.

SUMMARY

In accordance with one embodiment of the present invention, a lens mount for use with a miniature camera includes: a ring member having a substantially cylindrical interior surface defining a substantially cylindrical interior space; and a plurality of elongate ribs disposed on the interior surface of the ring member, wherein the ribs are adapted to exert pressure against an external surface of a lens barrel received by the ring member.

In accordance with another embodiment of the present invention, a lens mount for use with a miniature camera, includes: a ring member; a base member; a plurality of flexure members attaching the ring member with the base member; and a plurality of tension members associated with the flexure members, wherein each tension member is adapted to exert force on at least one of the flexure members, wherein the at least one of the flexure members is adapted to bend in response to the force, and wherein the ring member is adapted to move in response to the bending of the at least one of the flexure members.

In accordance with another embodiment of the present invention, a lens mount for use with a miniature camera includes: a ring member; a base member flexibly connected with the ring member; and a first actuator assembly connected with a first side of the ring member and adapted to move the ring member in a first plurality of directions relative to the base member.

In accordance with another embodiment of the present invention, a method of positioning a lens barrel, includes: inserting a lens barrel into a ring member having a substantially cylindrical interior surface; and exerting pressure against an external surface of the lens barrel from a plurality of elongate ribs disposed on the interior surface of the ring member, wherein the pressure prevents rotation of the lens barrel along at least three axes of rotational freedom.

In accordance with another embodiment of the present invention, a method of positioning a lens includes: providing a lens mount comprising: a ring member, a base member, and a first flexure member attaching the ring member with the base member; providing a lens held by the ring member; applying force to the first flexure member; permitting the first flexure member to bend in response to the force applied to the first flexure member; and permitting the ring member to move in response to the bending of the first flexure member.

In accordance with another embodiment of the present invention, a method of positioning a lens includes: providing a lens mount comprising: a ring member, a base member flexibly connected with the ring member, and a first actuator assembly connected with a first side of the ring member; providing a lens held by the ring member; and operating the first actuator assembly to move the ring member in a first direction relative to the base member.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Like element numbers in different figures represent the same or similar elements.

DETAILED DESCRIPTION

Figure 1:
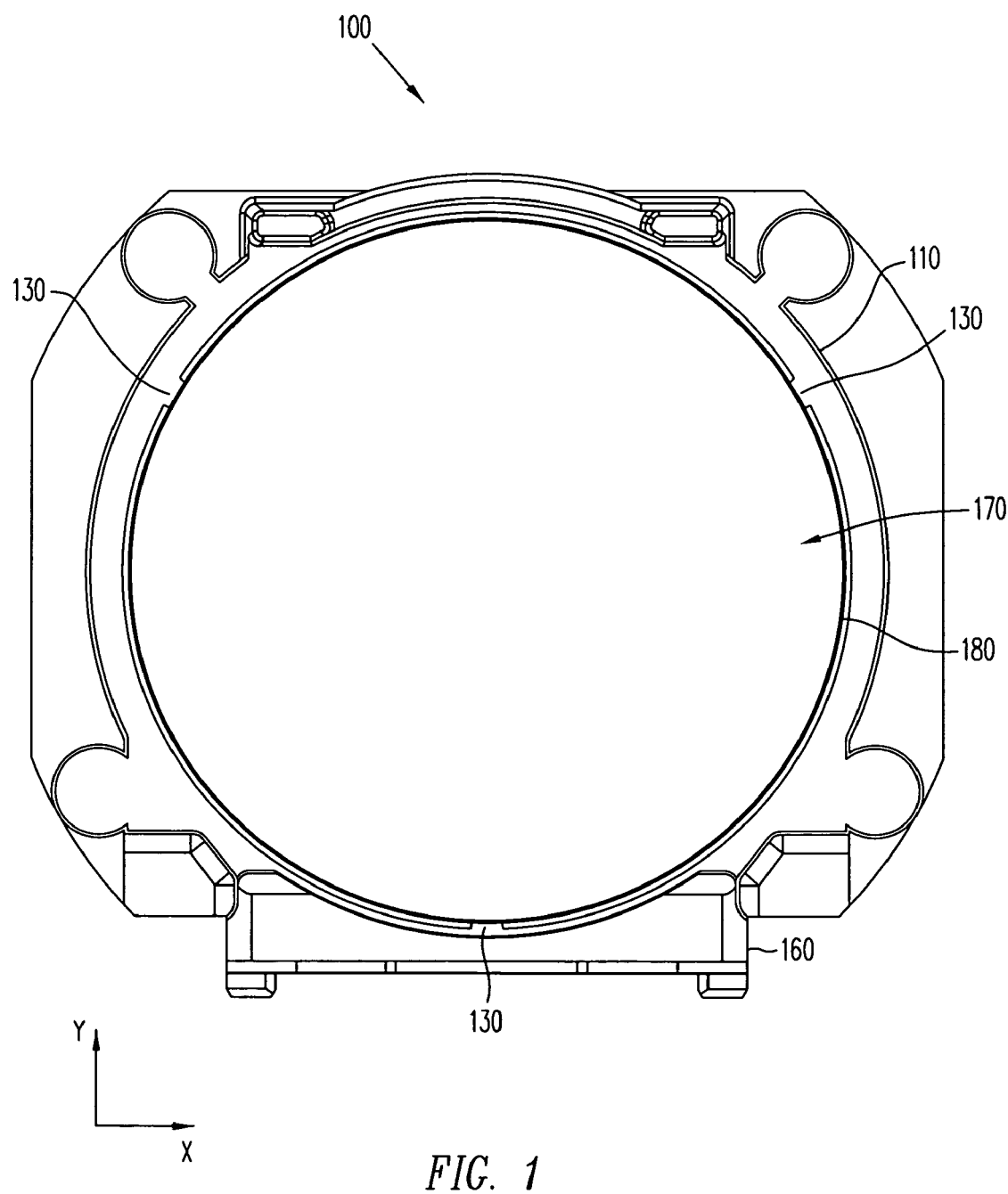
FIG. 1 illustrates a front view of a lens mount having a plurality of ribs in accordance with an embodiment of the present invention.
Figure 2:
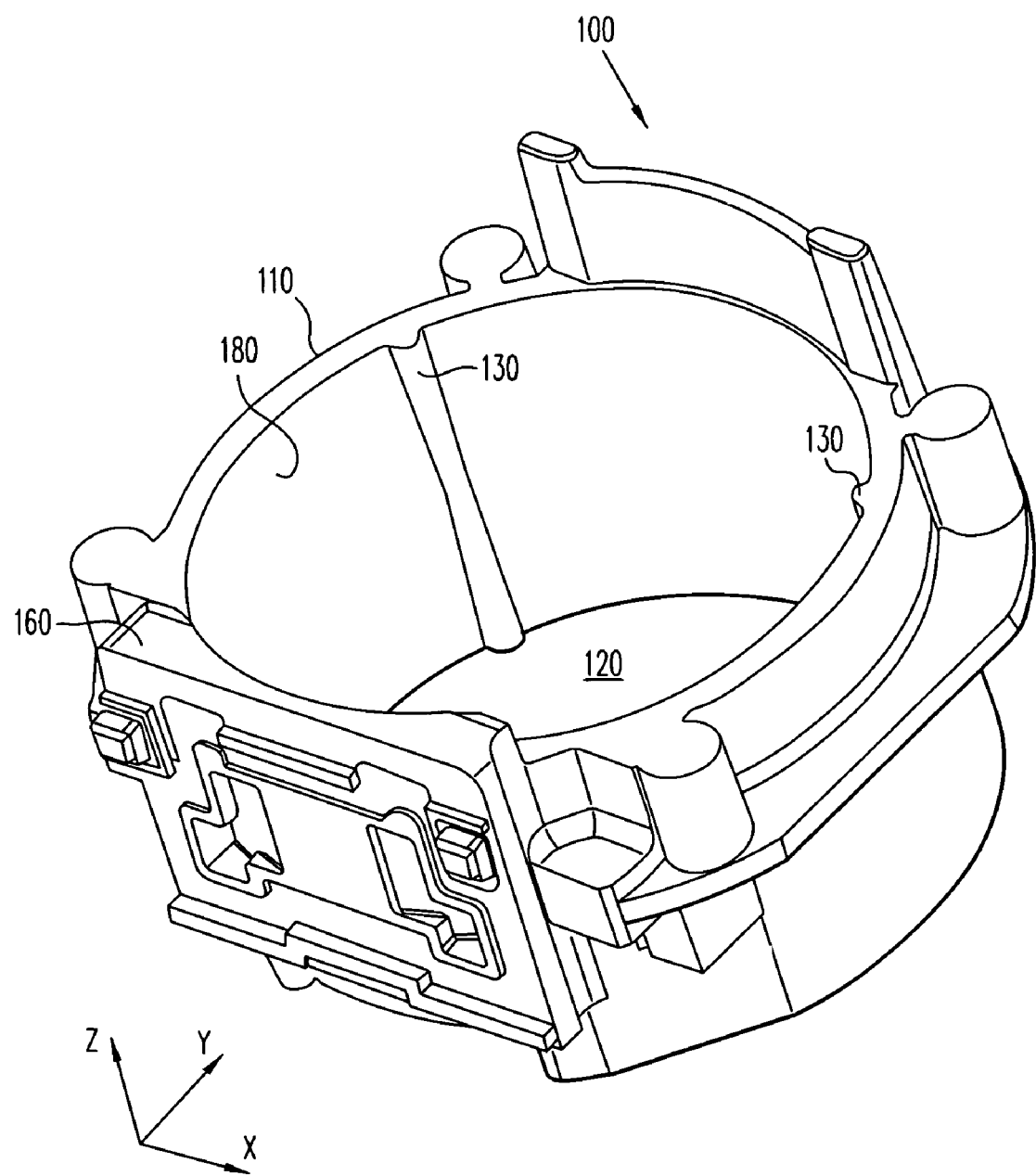
FIG. 2 illustrates a perspective view of the lens mount of FIG. 1 in accordance with an embodiment of the present invention.

Referring now to the drawings wherein the showings are for purposes of illustrating embodiments of the present invention only, and not for purposes of limiting the same, FIGS. 1 and 2 illustrate front and perspective views, respectively, of a lens mount 100 having a plurality of ribs 130 in accordance with an embodiment of the present invention. Lens mount 100 includes a ring member 110 connected with a base member 160. A substantially cylindrical interior surface 180 of lens mount 100 defines a substantially cylindrical interior space 120. Ribs 130 are disposed on interior surface 180 and can exhibit substantially hemispherical surfaces facing toward interior space 120.

As illustrated in FIG. 1, a lens barrel 170 can be inserted into ring member 110. For example, in one embodiment, threads (not shown) can be provided on an external surface of lens barrel 170 for engaging threads (not shown) on interior surface 180. As a result, lens barrel 170 may be screwed into ring member 110. In FIG. 2, lens mount 100 is illustrated without lens barrel 170 in order to more fully show interior space 120, interior surface 180, and ribs 130.

Ribs 130 can be implemented in various configurations as may be desired for particular applications. For example, in one embodiment, ribs 130 may be implemented as being substantially parallel with each other. In another embodiment, ribs 130 may be substantially aligned along a length of interior surface 180. In yet another embodiment, ribs 130 may be approximately equally spaced about a perimeter of interior surface 180. It will also be appreciated that any desired number of ribs 130 may be used.

Figure 3:
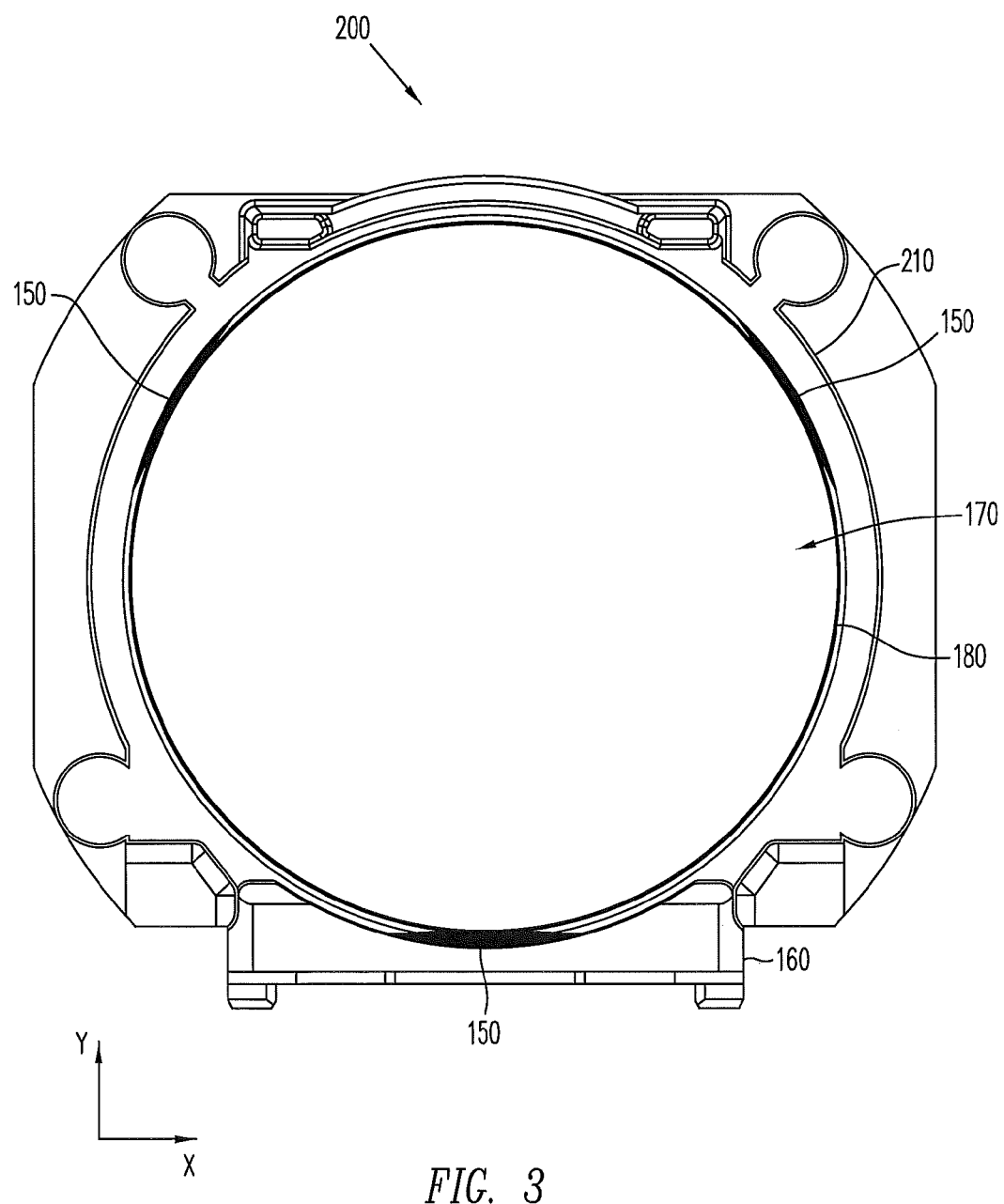
FIG. 3 illustrates a front view of another lens mount having a plurality of ribs in accordance with an embodiment of the present invention.
Figure 4:
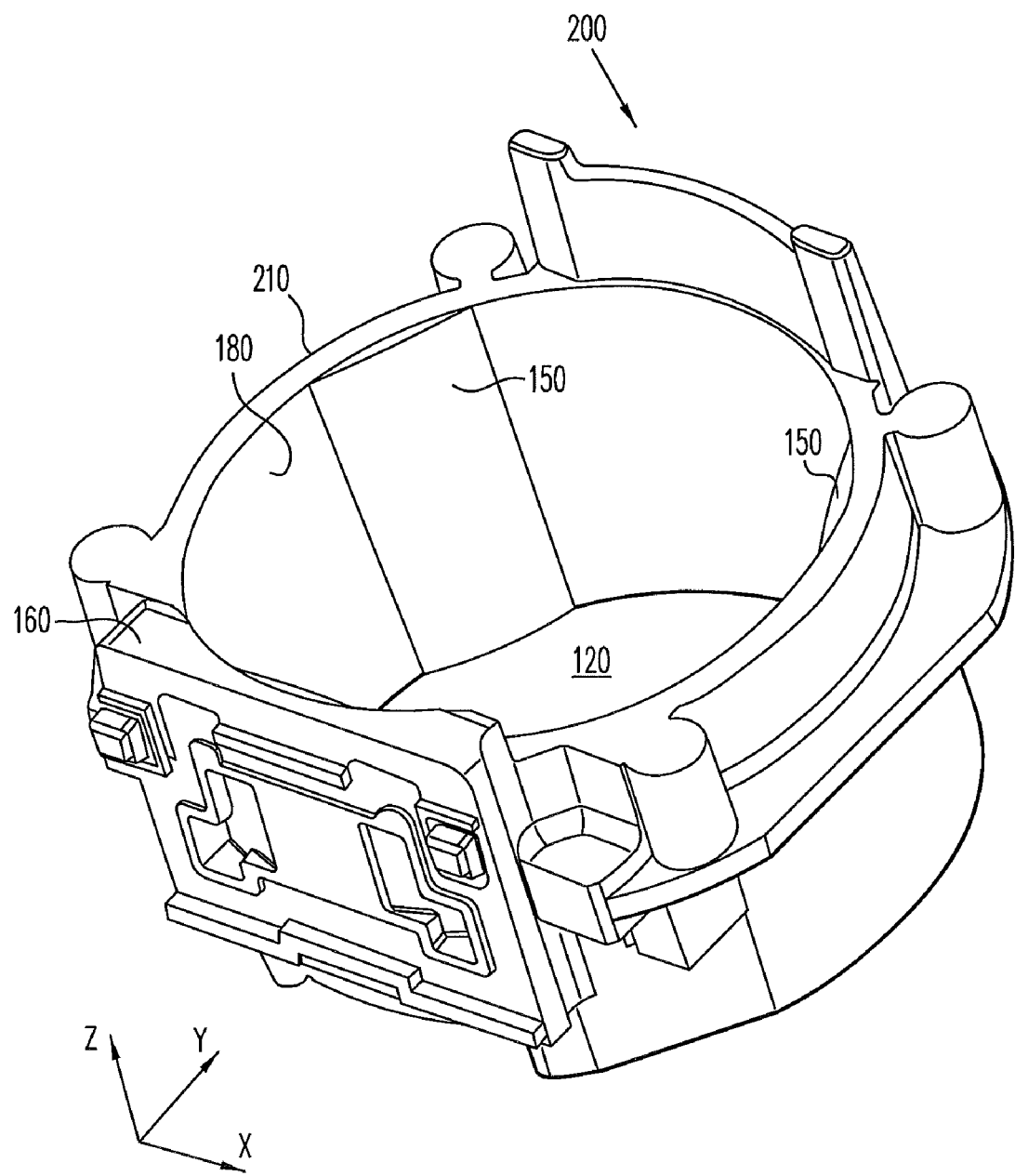
FIG. 4 illustrates a perspective view of the lens mount of FIG. 3 in accordance with an embodiment of the present invention.

FIGS. 3 and 4 illustrate front and perspective views, respectively, of another lens mount 200 having a plurality of ribs 150 in accordance with an embodiment of the present invention. It will be appreciated that lens mount 200 can be implemented in the manner of lens mount 100, with modifications made to ribs 130. In particular, ribs 130 have been replaced by ribs 150 which exhibit substantially flat surfaces facing toward interior space 120.

Ring members 110/210 and ribs 130/150 can be sized such that ribs 130/150 contact and exert pressure against an external surface of lens barrel 170 while it is inserted into ring members 110/210. As a result of the pressure between ribs 130/150 and lens barrel 170, lens barrel 170 can be prevented from rotating along at least three axes of rotational freedom: X axis (pitch), Y axis (yaw), and Z axis (roll) which are illustrated in FIGS. 1 and 2. This pressure can permit lens barrel 170 to remain securely held by ring members 110/210, despite possible imperfections in the diameters of lens barrel 170 or ring members 110/210.

As a result, it will be appreciated that lens mounts 100 and 200 can be used to align a lens, such as a lens of a digital camera provided alone or in lens barrel 170. For example, a lens or lens barrel 170 can be inserted into interior space 120 of ring member 110. Pressure can then be exerted against the external surface of the lens or lens barrel 170 from ribs 130/150. As a result of this pressure, rotation of lens barrel 170 along at least three axes of rotational freedom can be minimized. In one embodiment, the inserting operation can include screwing lens barrel 170 into ring member 110 or 210 by engaging threads (not shown) of lens barrel 170 with threads (not shown) of ring member 110 or 210.

Figure 5:
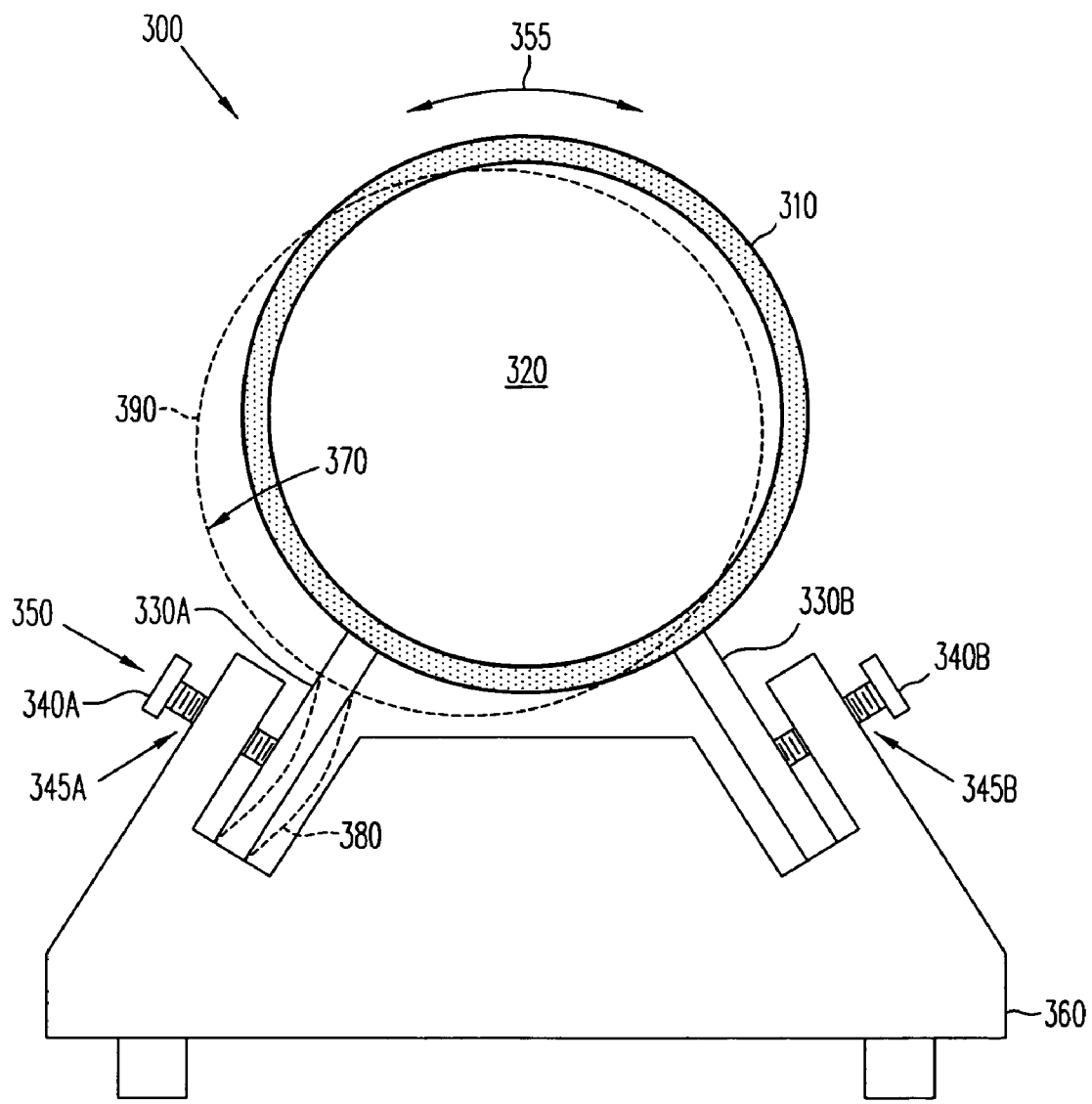
FIG. 5 illustrates a front view of a lens mount having a plurality of flexure members in accordance with an embodiment of the present invention.
Figure 5:
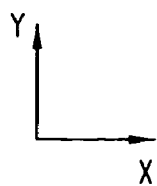

FIG. 5 illustrates a front view of a lens mount 300 having a plurality of flexure members 330A/B in accordance with an embodiment of the present invention. Lens mount 300 includes a ring member 310, a base member 360, flexure members 330A/B, and a plurality of tension members 340A/B.

Ring member 310 is attached with base member 360 by flexure members 330A/B. As a result, ring member 310 can be suspended and supported above base member 360 by flexure members 330A/B. A lens or lens barrel, such as lens barrel 170 of FIGS. 1 and 3 can be inserted into an interior space 320 of ring member 310. The lens or lens barrel can be secured with ring member 310 using threads and/or other appropriate engagement members.

Flexure members 330A/B can be implemented to be flexible and bendable in response to force exerted upon them by tension members 340A/B. In one embodiment, flexure members 330A/B may be comprised of silicon. Tension members 340A/B are associated with flexure members 330A/B and, in one embodiment, tension members 340A/B and flexure members 330A/B can have a one-to-one correspondence with each other. In the embodiment illustrated in FIG. 5, tension members 340A/B are implemented as screws which may be screwed into base member 360 through appropriate apertures 345A/B in base member 360 for receiving tension members 340A/B. However, it will be appreciated that tension members 340A/B may alternatively be implemented as actuators, micro-electro-mechanical systems (MEMS) devices, or any other appropriate components suitable for exerting force on one or more of flexure members 330A/B. In one embodiment, flexure member 330A and tension member 340A may comprise a first MEMS device, and flexure member 330B and tension member 340B may comprise a second MEMS device. In such an embodiment, flexure members 330A/B may optionally be comprised of silicon.

Force can be applied to one or more of flexure members 330A/B by one or more of tension members 340A/B. For example, force can be applied by left tension member 340A to left flexure member 330A in the direction of arrow 350 by screwing left tension member 340A into base 360. As a result of the force applied by left tension member 340A, left flexure member 330A can be permitted to bend to a deformed position 380. In response to the bending of left flexure member 330A, ring member 310 can be permitted to move in an arc in the direction of arrow 370 to a translated position 390. It will be appreciated that the operations mirroring those described with reference to left flexure member 330A and left tension member 340A can be performed using right flexure member 330B and right tension member 340B.

It will be appreciated that by applying various amounts of force to one or more of flexure members 330A/B through one or more of tension members 340A/B, ring member 310 can be translated in a plurality of directions. For example, by selectively applying force from left tension member 340A or right tension member 340B, ring member 310 can be made to rotate along at least one axis of rotational freedom in the directions of arrows 355. It will be appreciated when ring member 310 is moved in the directions of arrows 355, it can be moved along at least two axes of translational freedom (i.e., along both the X and Y axes denoted in FIG. 5). Moreover, by applying approximately equal force by tension members 340A/B, ring member 310 can be moved up and down in directions corresponding to one axis of translational freedom (i.e., along the Y axis denoted in FIG. 5).

By moving ring member 310 in relation to the various degrees of freedom as discussed above, the lens or lens barrel secured by ring member 310 can be adjusted in relation to an imager, thereby permitting the lens or lens barrel held by ring member 310 to be aligned with the imager.

Figure 6:
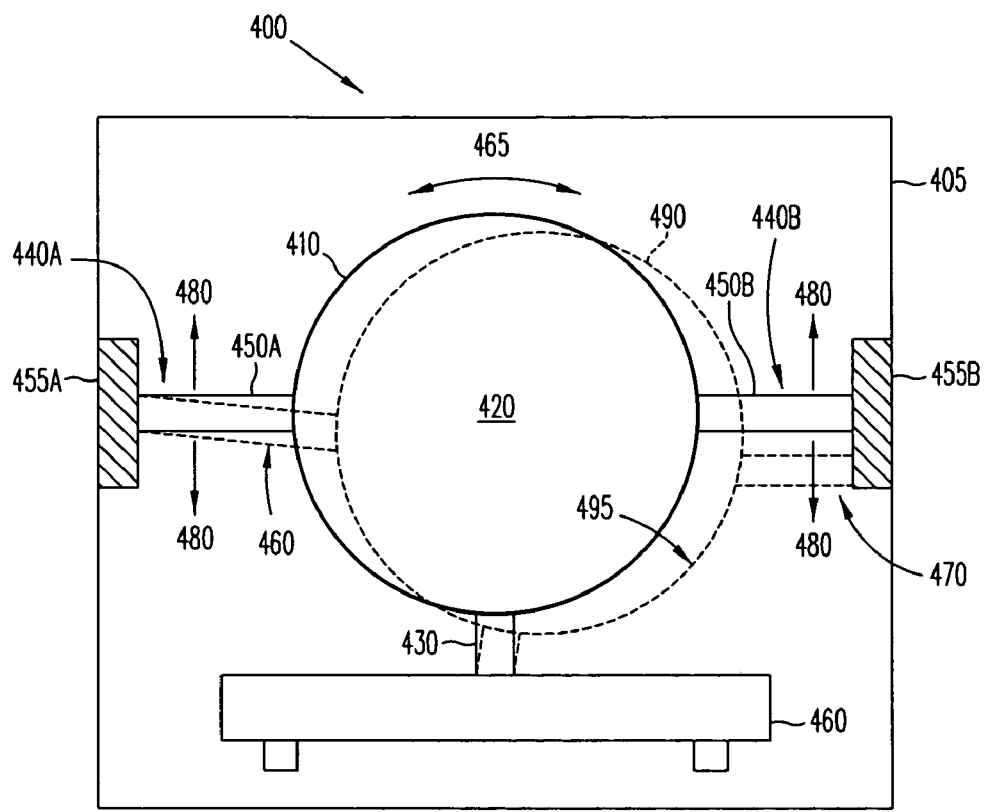
FIG. 6 illustrates a front view of a lens mount having a plurality of actuator assemblies in accordance with an embodiment of the present invention.

FIG. 6 illustrates a front view of a lens mount 400 having a plurality of actuator assemblies 440A/B in accordance with an embodiment of the present invention. Lens mount 400 includes a ring member 410, a base member 460, a flexure member 430, actuator assemblies 440A/B, and a frame 405.

Ring member 410 is flexibly connected with base member 460 by flexure member 430. As a result, ring member 410 can remain connected with base member 460 as ring member 410 is translated in various directions, as described herein. Actuator assemblies 440A/B connect sides (for example, opposite sides) of ring member 410 with frame 405, allowing ring member 410 to be suspended and supported above base member 460 by actuator assemblies 440. A lens or lens barrel, such as lens barrel 170 of FIGS. 1 and 3 can be inserted into an interior space 420 of ring member 410. The lens or lens barrel can be secured with ring member 410 using threads and/or other appropriate engagement members.

Each of actuator assemblies 440A/B can include an actuator 455A/B and a flexure member 450A/B. Actuators 455A/B can be connected with frame 405 and implemented to move flexure members 450A/B in a plurality of directions, such as in the directions of arrows 480. Actuators 455A/B may be implemented as micro-electro-mechanical systems (MEMS) devices, manually operable mechanisms, or any other appropriate components suitable for moving flexure members 450A/B. Flexure members 450A/B can connect actuators 455A/B with sides of ring member 410. As a result, actuators 455A/B can cause ring member 410 to move in response to the motion of flexure members 450A/B.

Force can be applied to flexure members 450A/B by one or more of actuators 455A/B. For example, force can be applied by right actuator 455B to move right flexure member 450B in a downward direction. As a result, right flexure member 450B can be moved down to position 470. In response, ring member 410 can be permitted to move in an arc in the direction of arrow 495 to a translated position 490. As also illustrated in FIG. 6, left flexure member 450A can be permitted to bend with the movement of ring member 410, resulting in left flexure member 450A bending to position 460. In various embodiments, the operations of left and right actuators 455A/B as well as left and right flexure members 450A/B may be interchanged.

It will be appreciated that by applying various amounts of force to one or more of flexure members 450A/B by one or more of actuators 455A/B, ring member 410 can be translated in a plurality of directions. For example, by selectively applying force from left actuator 455A or right actuator 455B, ring member 410 can be made to rotate along at least one axis of rotational freedom in the directions of arrows 465. It will be appreciated when ring member 410 is moved in the directions of arrows 465, it can be moved along at least two axes of translational freedom (i.e., along both the X and Y axes denoted in FIG. 6). Moreover, by applying approximately equal force by actuators 455A/B, ring member 410 can be moved up and down in directions corresponding to one axis of translational freedom (i.e., along the Y axis denoted in FIG. 6).

It will be appreciated that actuators 455A/B can also be implemented to apply force to flexure members 450A/B in opposite directions. For example, actuator 455A could be operated to move flexure member 450A in a downward direction while actuator 455B is operated to move flexure member 450B in an upward direction, or vice versa. Such differential operation of actuators 455A/B can permit ring member 410 to be moved in left and right directions along the X axis denoted in FIG. 6.

In one embodiment, the lens or lens barrel secured with ring member 410 can be implemented with a focal length of approximately 6.65 mm, and actuators 455A/B can be operated to move flexure members 450A/B by approximately 0.050 mm, yielding a range of motion for ring member 410 of approximately ±0.43 degrees in the directions of arrows 465. In another embodiment, actuators 455A/B can each be implemented to exert a force of approximately 9.85 mN in the directions of arrows 480.

By moving ring member 410 in relation to the various degrees of freedom as discussed above, the lens or lens barrel secured by ring member 410 can be adjusted in relation to an imager, thereby permitting the lens barrel to be aligned with the imager.

Figure 7:
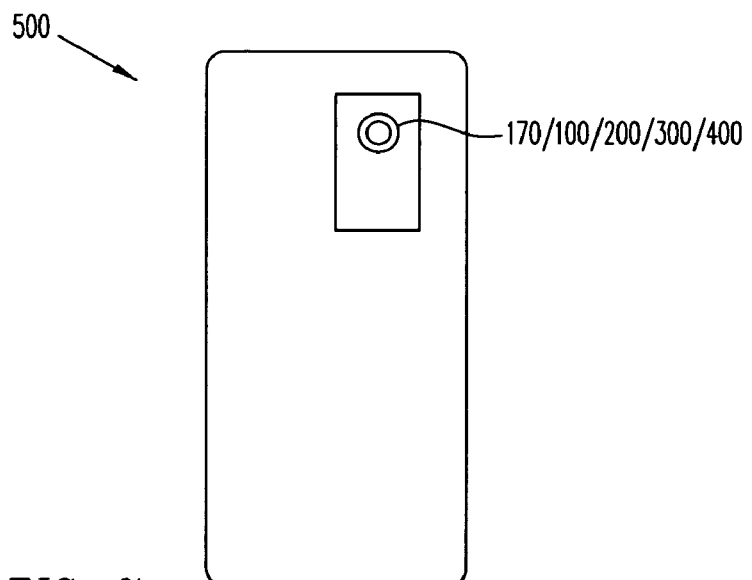
FIG. 7 illustrates a personal electronic device incorporating a lens mount in accordance with an embodiment of the present invention.

It will be appreciated that lens mount 100, 200, 300, or 400 may be implemented as part of a camera in various types of personal electronic devices, such as a digital camera, portable computer, a laptop computer, a notebook computer, a pocket personal computer (pocket PC), a personal digital assistant (PDA), a mobile telephone, or any other appropriate personal electronic device. FIG. 7 illustrates a top view of one such personal electronic device 500. As illustrated in the embodiment set forth in FIG. 7, personal electronic device 500 may include a lens or lens barrel 170 held by lens mount 100, 200, 300, or 400.

In view of the present disclosure, it will be appreciated that various features set forth herein provide significant improvements to the alignment of lenses and lens mounts. In particular, the positions of lens mounts 100, 200, 300, and 400 can be adjusted with respect to various degrees of freedom in order to appropriately align various lenses or lens barrels secured thereby.

The foregoing disclosure is not intended to limit the present invention to the precise forms or particular fields of use disclosed. It is contemplated that various alternate embodiments and/or modifications to the present invention; whether explicitly described or implied herein, are possible in light of the disclosure.

For example, ring members 110, 310, or 410 may be implemented as complete rings as illustrated in the accompanying figures, or may alternatively be implemented as portions of rings. As another example, one or more individual or composite lenses may be utilized in place of lens barrel 170 in lens mounts 100, 200, 300, and 400 in accordance with alternate embodiments of the present invention.

Moreover, the various adjustments described herein can be made in real time to provide image stabilization. For example, tension members 340A/B and/or actuators 455A/B can be interfaced with appropriate control circuitry to cause ring members 310 or 410 to move in response to bumps or impacts received by a digital camera. As a result, lenses or lens barrels secured in ring members 310 or 410 can be repeatedly re-aligned with an imager to compensate for such occurrences.

Where applicable, the various components set forth herein can be combined with each other and/or separated into sub-components without departing from the spirit of the present disclosure. In addition, where applicable, the ordering of various steps described herein can be changed, combined into composite steps, and/or separated into sub-steps to provide features described herein.

What is claimed is:

1. A lens mount for use with a miniature camera, the lens mount comprising:
   a ring member having a substantially cylindrical interior surface defining a substantially cylindrical interior space; and
   a plurality of elongate ribs disposed on the interior surface of the ring member, wherein the ribs are adapted to exert pressure against an external surface of a lens barrel received by the ring member, wherein the ribs are adapted to deform to permit the ring member to maintain the substantially cylindrical interior surface while the lens barrel is received by the ring member and secured in the ring member by the pressure.

2. The lens mount of claim 1, wherein the ribs are substantially parallel with each other.

3. The lens mount of claim 1, wherein the ribs are substantially aligned along a length of the interior surface.

4. The lens mount of claim 1, wherein the ribs are approximately equally spaced about a perimeter of the interior surface.

5. The lens mount of claim 1, wherein the ribs comprise substantially flat surfaces facing toward the interior space.

6. The lens mount of claim 1, wherein the ribs comprise at least three ribs.

7. The lens mount of claim 1, wherein the lens mount is part of a personal electronic device.

8. The lens mount of claim 1, wherein the ribs comprise substantially hemispherical surfaces facing toward the interior space.

9. A method of positioning a lens barrel, the method comprising:
   inserting a lens barrel into a ring member having a substantially cylindrical interior surface;
   exerting pressure against an external surface of the lens barrel from a plurality of elongate ribs disposed on the interior surface of the ring member, wherein the pressure prevents rotation of the lens barrel along at least three axes of rotational freedom; and
   deforming the ribs to permit the ring member to maintain the substantially cylindrical interior surface while the lens barrel is received by the ring member and secured in the ring member by the pressure.

10. The method of claim 9, wherein the inserting operation comprises screwing the lens barrel into the ring member.

11. The method of claim 9, wherein the ribs are substantially parallel with each other.

12. The method of claim 9, wherein the ribs are substantially aligned along a length of the interior surface.

13. The method of claim 9, wherein the ribs are approximately equally spaced about a perimeter of the interior surface.

14. The method of claim 9, wherein the ribs comprise substantially hemispherical surfaces facing toward the interior space.

15. The method of claim 9, wherein the ribs comprise substantially flat surfaces facing toward the interior space.

16. The method of claim 9, wherein the ribs comprise at least three ribs.

* * * * *